April 2, 1957 — R. S. KOFFORD — 2,787,420
EGG COUNTER
Filed April 19, 1955
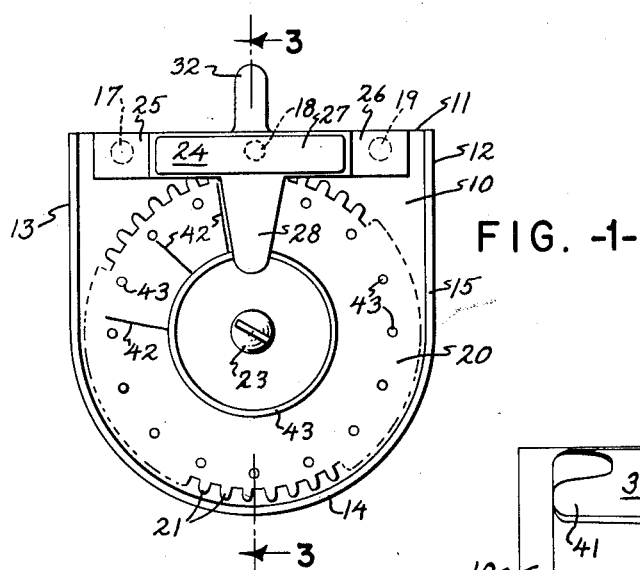
FIG.-1-
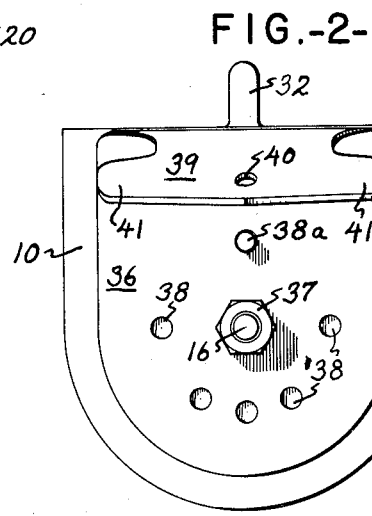
FIG.-2-
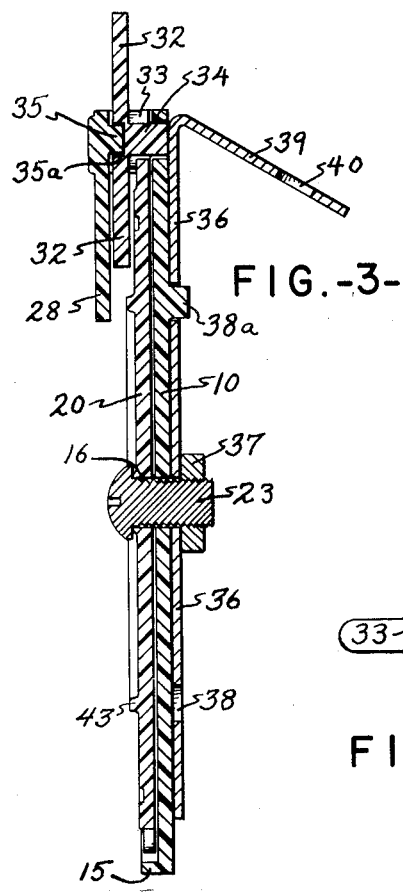
FIG.-3-
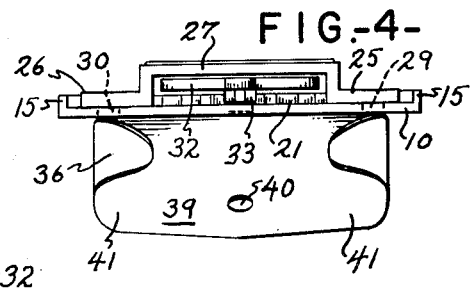
FIG.-4-
FIG.-5-
REED S. KOFFORD
*INVENTOR.*
BY Robert C. Comstock
HIS ATTORNEY

United States Patent Office 2,787,420
Patented Apr. 2, 1957

2,787,420

EGG COUNTER

Reed S. Kofford, Van Nuys, Calif.

Application August 19, 1955, Serial No. 529,450

8 Claims. (Cl. 235—122)

This invention relates to an egg counter for poultrymen and more particularly to such a device which is designed to keep a simple and accurate record of egg production of each hen in the flock.

Although most devices of this type are customarily referred to in the trade as egg counters, it is also the custom of many poultrymen to keep a record of "misses" rather than eggs, such number being smaller and capable of more instant interpretation. In their simplest form, egg laying records are kept by making a pencil mark on a cage or chart attached to a cage on each day that a hen has laid an egg or missed by failing to lay an egg, whichever system of counting is used.

It is an object of my invention to provide a device which is capable of simple and rapid use to keep a record of egg production for an extended period of time and which is thereafter capable of repeated use for the same purpose. It is particularly an object of my invention to provide such a device which requires only infrequent marking with a pencil and which is capable of being operated quickly and without waste motion, even when the poultryman's hands are full of eggs.

Another object of my invention is to provide such a device which is versatile in the sense that it can be mounted for use on substantially any cage and in substantially any position desired, for use by the left or right hand, moving in substantially any direction desired.

A further object of my invention is to provide such a device which is simple and economical in construction being formed substantially entirely of molded plastic, so that it is capable of being sold at a comparatively low price, making it feasible for quantity use by poultrymen having large numbers of chickens.

It is another object of my invention to provide such a device which is simple to operate, simple and rapid to read and interpret, and which will not break down in use. It is particularly an object of my invention to provide such a device which is easy to read so that the poultryman can quickly and easily review the production records of his flock for removal of the hens which fail to meet satisfactory production requirements.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings,

Fig. 1 is a front plan view of my egg counter;
Fig. 2 is a rear plan view of the same;
Fig. 3 is a sectional view of the same, taken on line 3—3 of Fig. 1;
Fig. 4 is a top plan view of the same;
Fig. 5 is a top plan view of the dial trip.

A preferred embodiment which has been selected to illustrate my invention comprises a base plate 10, which is flat and substantially arch shaped, having one straight end 11, a pair of straight sides 12 and 13 and a rounded opposite end 14. An integral continuous ridge 15 extends upwardly from base plate 10 at a right angle along sides 12 and 13 and top 14. Base plate 10 is preferably formed of a single piece of suitable molded plastic and is provided with a centrally disposed opening 16 and three spaced openings 17, 18 and 19 adjacent bottom 11.

A rotatable member 20 is likewise preferably formed of a single piece of suitable molded plastic and is substantially flat and circular in shape. The periphery of rotatable member 20 is provided with a plurality of spaced integrally formed gear teeth 21 which extend completely therearound. Rotatable member 20 is provided with a centrally disposed opening and is mounted on the front of base plate 10 by means of a screw 23, which extends through openings 16 and 22. The thickness of rotatable member 20 is substantially equal to the height of ridge 15. One half of the periphery of rotatable member 20 is concentric with and disposed closely adjacent to ridge 15, where it extends around rounded end 14, so that gear teeth 21 are protected by ridge 15 from accidental contact or engagement.

Mounted along end 11 of base plate 10 is a marking guide 24, which preferably comprises a single piece of molded plastic. Marking guide 24 is provided at its opposite ends with a pair of flanges 25 and 26, between which is a center portion 27 which is upwardly disposed therefrom. Extending transversely from central portion 27 and formed integrally therewith is a substantially V-shaped member 28 having straight sides.

The flanges 25 and 26 of marking guide 24 are provided with pins 29 and 30 respectively, which are fitted within openings 17 and 19 into base plate 10. A small amount of plastic solvent may be applied to the back of base plate 10 to seal pins 29 and 30 within openings 17 and 19 and firmly mount marking guide 24 on base plate 10. When marking guide 24 is so mounted, V-shaped member 28 points directly toward the center of rotatable member 20 and overlies part thereof.

A finger wheel 31 is preferably formed of a single piece of molded plastic and has four cross arms 32 extending at 90° angles. Disposed adjacent cross arms 32 is an integral gear 33 having four teeth. Extending from gear 33 is an integral mounting pin 34, which is rotatably mounted in opening 18 in base plate 10. The central portion 27 of marking guide 24 is provided with a pin 35, which fits into a centrally disposed recess 35a in gear 33. The recess 35a is aligned with pin 34. Pins 34 and 35 thus act to hold finger wheel 31 in position, while permitting it to rotate with respect to marking guide 24 and base plate 10.

The teeth of gear 33 mesh with the gear teeth 21 of rotatable member 20. The cross arms 32 of finger wheel 31 are so dimensioned that they terminate short of the end flanges 25 and 26, permitting finger wheel 31 to rotate beneath marking guide 24. If one of the cross arms 32 is projecting at a right angle from marking guide 24, the other cross arms 32 are all concealed. Two are disposed beneath central portion 27, extending in opposite directions from each other, while the third is disposed beneath V-shaped member 28.

The base plate 10 is attached to a mounting bracket 36 by means of screw 23, which extends through a central opening in mounting bracket 36. A nut 37 is screw threadedly mounted on the end of screw 23 on the opposite side of mounting bracket 36. Mounting bracket 36 is also provided with a plurality of smaller openings 38, which are disposed around nut 37. A pin 38a projects rearwardly from the back of base plate 10 and is adapted to fit into any one of the smaller openings 38 in order to orient and position mounting bracket 36 with respect to base plate 10.

Mounting bracket 36 is provided with an angular portion 39 having a central opening 40, which is adapted to receive a mounting bolt, and a pair of oppositely directed wings 41. The material forming mounting bracket 36 is preferably metal which is sufficiently soft so that the wings 41 can be manually bent to fit around the wires of a chicken cage in order to attach my counter thereto. It will be noted that if the nut 37 is loosened and pin 38a moved to the various openings 38, a large number of positions of mounting my counter may be achieved. The counter can be mounted so that the projecting cross arm 32 of finger wheel 31 projects upwardly, downwardly, to either side or at an angle.

In use, my counter is suitably attached to a chicken cage, preferably by bending the wings 41 back to overlie angular portion 39 of mounting bracket 36, each wing fitting around one of a pair of spaced wires comprising part of the cage.

Before the counter is used, a pencil mark 42 is made by moving a pencil along one of the straight sides of V-shaped member 28, causing a mark to be made on the face of rotatable member 20. The pencil mark 42 will extend from adjacent gear teeth 21 toward the center of rotatable member 20. The face of rotatable member 20 is provided with an integrally formed circular ridge 43, which is concentric with the periphery of rotatable member 20 and which acts as a stop for the point of the pencil. The sides of V-shaped member 28 are slanted so that the pencil mark is substantially radial with respect to rotatable member 20. The pencil mark 42 should be made on the side of the V-shaped member which is opposite to the direction of intended movement of cross arm 32 of finger wheel 31.

After the pencil mark 42 has been made, the counter is operated by moving the projecting cross arm 32 in a direction away from pencil mark 42 each time a given hen lays or fails to lay an egg, which ever system of counting is used. The movement required is one sufficient to move the cross arm 32 until it passes beneath central portion 27, which acts as a stop to prevent further movement. The finger wheel 31 has then been rotated 90°, bringing another cross arm 32 into position for the next counting movement.

The rotation of finger wheel 31 causes the rotatable member 20 to be rotated in the opposite direction a distance equal to that of one gear tooth 21. This movement is accomplished through the intermeshing of drive gear 33 and gear teeth 21.

The counter is so used to record all of the eggs or misses until a set time period has elapsed. At such time, which is normally two weeks, another pencil mark 42 is made on the face of rotatable member 20. The counter is then used in the manner described for several additional time periods. It should be noted that a simple pencil mark is made only once every two weeks.

When the egg laying records of the chickens are to be reviewed, the poultryman need only glance at the face of the rotatable member 20 and note the number of eggs or misses which have been recorded thereon for each time period. The face of rotatable member 20 is provided with a plurality of index recesses 43, which are spaced around the periphery of rotatable member 20 inwardly from teeth 21, there being one recess 43 for each three teeth 21. A count can thus be obtained by counting the number of teeth between pencil marks or by using the recesses 43. With a little experience, a poultryman soon becomes able to check the count by a quick glance at the space between the pencil marks 42.

When the face of rotatable member 20 is substantially filled with pencil marks, a differently colored pencil may be used or the entire face or any part thereof may be easily cleaned with paint thinner or any other suitable composition to permit re-use of the counter indefinitely. No resetting of the counter is necessary.

My counter is symmetrical in construction, so that it may be operated in either direction and may be used by both left and right handed persons.

I claim:

1. An egg counter for poultrymen comprising a flat substantially arch-shaped base member formed from a single piece of molded plastic, a substantially circular flat rotatable member formed from a single piece of molded plastic, said rotatable member being rotatably mounted adjacent the center of said base member, said rotatable member having a plurality of spaced gear teeth extending around its entire periphery, an integral ridge extending at substantially a right angle along the arch shaped portion of said base member, said ridge being substantially equal in height to the thickness of said rotatable member, said ridge protecting said gear teeth from accidental engagement, a marking guide having a substantially V-shaped portion extending over a part of said rotatable member, a finger wheel rotatably mounted between said marking guide and said rotatable member, said finger wheel having four cross arms disposed at 90° angles, said finger wheel having four gear teeth adapted to mesh with the gear teeth on said rotatable member, said finger wheel being mounted adjacent the non-arch-shaped end of said base member, each of said cross arms adapted to be moved from a position projecting from said base member to a position 90° removed therefrom underlying said marking guide, the rotation of said cross arm rotating said finger wheel to cause said rotatable member to rotate the distance of one of its gear teeth, said rotatable member having an integral central ridge adapted to provide a pencil stop, the sides of the V-shaped portion of said marking guide being substantially straight and substantially radial with respect to said rotatable member.

2. An egg counter for poultrymen comprising a flat substantially arch shaped base member, a substantially circular flat rotatable member rotatably mounted with respect to said base member, said rotatable member having a plurality of spaced gear teeth extending around its entire periphery, a marking guide having a substantially V-shaped portion extending over part of said rotatable member, a finger wheel rotatably mounted adjacent said marking guide and rotatable member, said finger wheel having four cross arms disposed at 90° angles, said finger wheel having gear teeth adapted to mesh with the gear teeth of said rotatable member, each of said cross arms adapted to be moved from a position projecting from said base member to a position 90° removed therefrom underlying said marking guide, the movement of said cross arm rotating said finger wheel to cause said rotatable member to rotate, the sides of said V-shaped portion of said marking guide being substantially straight and substantially radial with respect to said rotatable member.

3. An egg counter for poultrymen comprising a base member, a substantially circular rotatable member rotatably mounted with respect to said base member, said rotatable member having a plurality of spaced gear teeth extending around its entire periphery, a marking guide having a portion extending over a part of said rotatable member, a finger wheel rotatably mounted between said marking guide and said rotatable member, said finger wheel having four cross arms disposed at 90° angles, said finger wheel having gear teeth adapted to mesh with the gear teeth on said rotatable member, each of said cross arms adapted to be moved from a position projecting from said base member to a position 90° removed therefrom underlying said marking guide, the rotation of said cross arm rotating said finger wheel to cause said rotatable member to rotate, the sides of said portion of said marking guide being substantially straight and substantially radial with respect to said rotatable member.

4. An egg counter for poultrymen comprising a base member, a substantially circular rotatable member rotatably mounted with respect to said base member, said rotable member having a plurality of spaced gear teeth extending around its entire periphery, a marking guide having a substantially V-shaped portion extending over a part of said rotatable member, a finger wheel rotatably mounted between said marking guide and said rotatable member, said finger wheel having cross arms, said finger wheel having gear teeth adapted to mesh with the gear teeth on said rotatable member, each of said cross arms adapted to be rotated to cause said rotatable member to rotate, the sides of said V-shaped portion of said marking guide being substantially straight and substantially radial with respect to said rotatable member.

5. An egg counter for poultrymen comprising a base member, a substantially circular rotatable member rotatably mounted with respect to said base member, said rotatable member having a plurality of spaced gear teeth extending around its entire periphery, a finger wheel rotatably mounted adjacent said rotatable member, said finger wheel having four cross arms disposed at 90° angles, said finger wheel having gear teeth adapted to mesh with the gear teeth on said rotatable member, each of said cross arms adapted to be moved from a position projecting radially outwardly from said base member to a position 90° removed therefrom, the rotation of said cross arms rotating said finger wheel to cause said rotatable member to rotate.

6. An egg counter for poultrymen comprising a substantially circular rotatable member having a plurality of spaced gear teeth extending around its entire periphery, a finger wheel rotatably mounted adjacent said rotatable member, said finger wheel having four cross arms disposed at 90° angles, said finger wheel having gear teeth adapted to mesh with the gear teeth on said rotatable member, each of said cross arms adapted to be moved from a position projecting from said rotatable member to a position 90° removed therefrom, such rotation of one of said cross arms causing the next cross arm to project from said rotatable member, the rotation of said cross arms rotating said finger wheel to cause said rotatable member to rotate.

7. An egg counter for poultrymen comprising a base member, a substantially circular rotatable member rotatably mounted with respect to said base member, said rotatable member having a plurality of spaced gear teeth extending around its entire periphery, a marking guide having a substantially V-shaped portion extending over a part of said rotatable member, a finger wheel rotatably mounted adjacent said rotatable member, said finger wheel having a plurality of cross arms, said finger wheel having gear teeth adapted to mesh with the gear teeth on said rotatable member, said cross arms adapted to be successively rotated to cause said finger wheel and rotatable member to rotate, the sides of said V-shaped portion of said marking guide being substantially straight and substantially radial with respect to said rotatable member.

8. An egg counter for poultrymen comprising a base member, a substantially circular rotatable member rotatably mounted with respect to said base member, said rotatable member having a plurality of spaced gear teeth extending around its entire periphery, a finger wheel rotatably mounted adjacent said rotatable member, said finger wheel having gear teeth adapted to mesh with the gear teeth on said rotatable member, said finger wheel having a plurality of cross arms, only one of said cross arms normally projecting from said base member, said projecting cross arm adapted to be rotated to bring the next adjacent cross arm into position projecting from said base member, the successive rotation of said cross arms rotating said finger wheel to cause said rotatable member to rotate.

References Cited in the file of this patent

UNITED STATES PATENTS

| | | |
|---|---|---|
| 192,093 | Stolp | June 19, 1877 |
| 554,460 | Rogginer | Feb. 11, 1896 |
| 589,910 | Shepard | Sept. 14, 1897 |
| 1,143,519 | Edmiston | June 15, 1915 |
| 2,563,572 | Alonso | Aug. 7, 1951 |

FOREIGN PATENTS

| | | |
|---|---|---|
| 721,248 | France | Dec. 2, 1931 |
| 730,940 | France | May 23, 1932 |